United States Patent [19]

Ehrat

[11] 4,145,568
[45] Mar. 20, 1979

[54] METHOD AND APPARATUS FOR CIPHERING AND DECIPHERING MESSAGES

[75] Inventor: Kurt Ehrat, Zurich, Switzerland

[73] Assignee: Gretag Aktiengesellschaft, Regensdorf, Switzerland

[21] Appl. No.: 401,795

[22] Filed: Oct. 6, 1964

[30] Foreign Application Priority Data

Oct. 18, 1963 [CH] Switzerland ............... 12787/63

[51] Int. Cl.² ............................................. H04L 9/02
[52] U.S. Cl. .................................. 178/22; 179/1.5 R
[58] Field of Search ................. 178/22, 26; 179/1.5, 179/2.5, 1.5 R; 325/32, 33, 34, 35, 122

Primary Examiner—Howard A. Birmiel
Attorney, Agent, or Firm—Burns, Doane, Swecker & Mathis

[57] ABSTRACT

Method and apparatus for ciphering and deciphering messages, wherein series of cipher pulses with an identical pulse distribution are generated by the transmitter and the receiver stations and said pulse distribution is determined by a secret basic code and a code which is derived from date and time.

14 Claims, 6 Drawing Figures

INVENTOR.
Kurt Ehrat
BY
Pierce Schiffler & Parker
Attorneys

METHOD AND APPARATUS FOR CIPHERING AND DECIPHERING MESSAGES

This invention relates to a method and apparatus for ciphering and deciphering messages.

Where it is necessary to transmit and receive information forming a message in a manner such as to prevent reception thereof by unauthorised persons, it is usual to cipher the message by mixing the information, represented by electrical pulse in the message with a series of randomly timed cipher pulses. The cipher pulses may be utilised individually or grouped together in predetermined combinations. The ciphered message is then transmitted by a transmitter to a receiver where reproduction of the original message is performed with the aid of a second series of cipher pulses identical to the first series of cipher pulses. The distribution of the pulses in the first and second series of pulses must be the same. In order to ensure adequate security against unauthorised deciphering, it is preferable to provide a long time delay before repeating the same series of cipher pulses and it is also desirable for the cipher pulses to exhibit a statistical (random) distribution.

Such ciphering and deciphering methods are known. A fundamental distinction can be made between two methods for generating the cipher pulse series.

In the first method, the cipher pulse generators used are perforated tapes, where a series of cipher pulses is obtained from what is called a random perforated tape. These are perforated tapes of the type known in telegraphy, in which the holes or combinations of holes are distributed in a purely random (statistical) manner to provide the cipher pulse series. Such an irregular series is usually generated by what are called random generators.

For the purpose of ciphering messages, it is necessary for identical random perforated tapes to be present at the transmitting and receiving ends, these tapes being brought into the same initial position at the transmitter and receiver at the commencement of transmission of a message and run synchronously starting from the initial position. From considerations of secrecy a random perforated tape may be used only once. Consequently one hole combination for a letter punched in the random tape can be used only once.

The advantage of this first method of ciphering lies in the fact that, having regard to the purely random distribution of the cipher pulses, unauthorised deciphering of the message is impossible without possession of the random perforated tape. A disadvantage of this method is the large consumption of random perforated tapes which must be manufactured, transported and stored in such a way that loss or theft is impossible. Furthermore this method is not suitable for what is called exchange traffic in which a transmitting or receiving station can be connected to any other desired station included in a large network of stations.

In the case of the second method of ciphering, mechanical, electrical or electronic appliances or circuits are used as cipher pulse generators. The programme and hence the distribution of cipher pulses generated by the latter is dictated by a cyclically varying position of a large number of cipher pulse-generating elements, for example cam wheels, permutating switches or electronic circuits, and by the associated wiring which may be changed by, for example, a plugboard. This cipher pulse programme is consequently dependent upon the construction and interplay of the individual pulse generating elements, and also upon the position of all these elements at the commencement of transmission of the message. This initial state, as it is called, of the programme must be adjusted at the transmitter and receiver before commencing transmission, whereafter, if the cipher pulse generators at the receiving and transmitting stations start synchronously and run synchronously, they deliver the required identical series of cipher pulses.

In order to ensure synchronous starting and synchronous running of the cipher pulse generators during the transmission of the message, special synchronising devices are necessary, which are described, for example, in British patent specification No. 918,371.

If the construction of the cipher pulse generators is known, the secrecy of the ciphering therefore consists solely in the identical state of the cipher pulse generator. This initial state is determined by a secret basic code, which may be taken by courier to the interconnected network of stations. In order to achieve the required cipher security, it is absolutely necessary to commence the ciphering from new initial positions of the cipher pulse generators every time. This is also necessary, for example, if connection with a fresh station is required to be initiated in exchange traffic, or in case of incorrect switching or incorrect operation of a cipher pulse generator.

The requirement to start from a new initial position of the cipher pulse generator each time a message is to be transmitted is fulfilled in the case of the known methods by using a different basic code each time. In these circumstances the various basic codes are assembled in tables and are distributed to the individual stations of the network. This has great disadvantages in exchange traffic since each basic code may be used only once and it is possible that two stations which are required to collaborate afresh no longer possess the same unused basic codes. Further disadvantages of these basic code tables reside in the large volume of secret basic codes required and the complications of handling them without endangering their security.

To mitigate these disadvantages it has already been proposed in British Patent Specification No: 951,174 to determine the initial state each time by the same secret basic code and by an additional programme determined at random each time. In this case the basic code is present in stored form at each station, whereas the additional code is determined at random at one of the stations at each initiation of a connection between stations and is then transmitted to the other stations. The generation of the additional code may be performed by means of a noise generator or the like. The secret basic code is of course also changed from time to time.

Communication systems which operate according to the method last described are able to function only if the transmission of the additional code to the individual stations, which is generally effected uncoded, is perfect. Otherwise it is impossible to provide an identical initial state at the individual stations. However, a perfect transmission can frequently be achieved only by relatively expensive fault-checking devices, particularly in the case of transmission channels which are prone to faults for example in two-way radio communication.

It is an object of the present invention to provide an improved method of ciphering and deciphering messages.

Accordingly there is provided a method of and apparatus for ciphering and deciphering messages comprising mixing a first series of cipher pulses with the message, transmitting the ciphered message and deciphering the ciphered message by mixing it with the second series of pulses identical with said first series and commencing simultaneously therewith, the distribution of pulses in the first and second series being determined by a basic code and an additional code which is derived from date and time.

There is further provided apparatus for ciphering and deciphering messages comprising, a first generator for generating a first series of cipher pulses, a transmitter for transmitting pulses representing a message, a first mixer for mixing said first series of pulses with pulses representing the message, a receiver for receiving a transmitted ciphered message, a second generator for generating a second series of cipher pulses identical to said first series, a second mixer for mixing the second series of pulses with the received ciphered message, means responsive to a mixed code for setting the first and second pulse generators to generate said first and second series of cipher pulses, means for producing said mixed code comprising a generator for generating a basic code, a generator for generating an additional code being derived from date and time and a mixer for mixing said basic code with said additional code to form said mixed code and means for synchronising the generation of said first and second series of pulses.

The above method is preferably performed in such a way that the date and time are converted to binary form and this series of binary symbols is used as additional code. Preferably the date and time are converted into minute intervals.

The date-time code introduces into the method a totally aperiodic additional code which can be generated independently at the transmitter and receiver at any time.

The date-time code may also intermittently control the generators providing the cipher pulses at the transmitting and receiving ends during the transmission of the ciphered messages, thus rendering their cipher pulse programmes totally aperiodic.

In order to generate the date-time code accurately, the transmitter and the receiver preferably include a quartz-controlled clock to achieve chronological precision of 1 sec/day. The clock at the receiver may be periodically checked with the clock at the transmitter.

The basic code and the date-time code, and also the initial state, may be represented for example by a series of letters or numbers, each series having the same number of letters or numbers. The individual letters or numbers of the initial state and of the basic code are distributed in irregular sequence so far as is possible. Preferably the initial state, basic code and date-time code are represented by binary numbers.

The number of possible initial states of the code generator is preferably large as compared with $10^{10}$. By this means the possible number of initial states is so large that they are not easily determined by hunting processes, even when the most rapid electronic means and circuits are employed.

The basic code is stored at the transmitter and receiver in a perforated tape or in mechanical, electromechanical, magnetic or photographic storage devices.

The representation of the initial state and of the basic code and date-time code in binary form further facilitates the application of the method to the transmission of messages in the form of impulses, wherein only two impulse states are generally possible, for example the states "0" and "1" or states plus and minus.

In order to obtain the initial state the basic code and the date-time code are mixed together. If both of the codes consist of a numerical series, then mixing may be performed by addition of the corresponding orders of the individual elements in each series without carry as follows:

Basic code: 1 7 5 4 3 9 2 8 6 5
Date-time code: 2 7 0 3 6 3 1 9 4 8
Mixture: 3 4 5 7 9 2 3 7 0 3

If each element of the basic and date-time codes is in the form of a binary number, then mixing may be performed by applying the known method of what is called "module 2 addition":

$0 + 0 = 0$ $0 + 1 = 1$ $1 + 0 = 1$ $1 + 1 = 0$

The basic code may be generated and stored directly in binary form. The date-time code, which is present in the form of decimal numbers, can be converted into binary form by the known transposition of decimal numbers into binary numbers. Thus, for example, with a conversion code:

$0 = 0 0 0 0$ $1 = 0 0 0 1$ $2 = 0 0 1 0$ $3 = 0 0 1 1$ $4 = 0 1 0 0$ $5 = 0 1 0 1$ $6 = 0 1 1 0$ $7 = 0 1 1 1$ $8 = 1 0 0 0$ $9 = 1 0 0 1$ the above-mentioned date-time code 2 7 0 3 6 3 1 9 4 8 will have e.g. the following appearance in binary form:

| 0010 | 0111 | 0000 | 0011 | 0110 | 0011 | 0001 | 1001 | 0100 | 1000 |
|------|------|------|------|------|------|------|------|------|------|
| 2 | 7 | 0 | 3 | 6 | 3 | 1 | 9 | 4 | 8 |

It is the function of each of the cipher pulse generators to produce a code impulse series which depends solely and exclusively upon its initial state. If identical cipher pulse generators are brought to the same initial state, then they will time and again generate the same reproducible cipher pulse series. These cipher pulse series are preferably repeated with as long a period as possible between each repetition and the variation between consecutive pulses or groups or pulses should be so far as possible irregular (random). Furthermore, the construction of the code generators should so far as possible be such that no simple deduction from the cipher pulse programme can be made to ascertain its initial state.

A preferred embodiment of the invention will be explained in further detail hereinbelow with reference to the accompanying drawings, in which.

Figure 1:
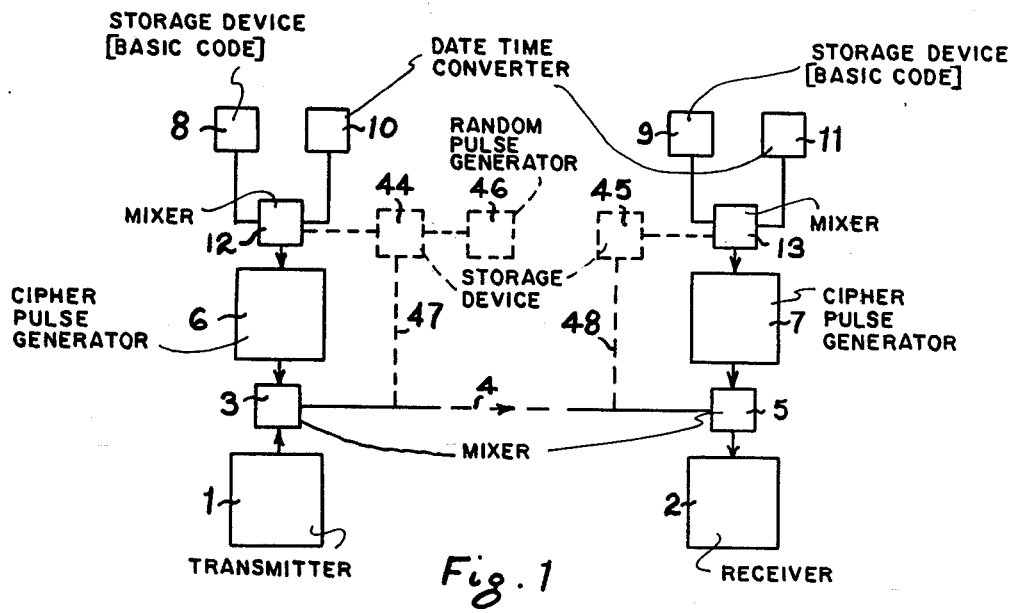
FIGS. 1 and 2 show a block circuit diagram of two different embodiments of apparatus for performing the method according to the invention.

In FIG. 1 a transmitter 1 converts clear message text into pulses and transmits them to a receiver 2 where the pulses are converted into clear text. The transmitter and receiver are in this embodiment teleprinters. The output of the teleprinter 1 feeds the clear message pulses into a mixing device 3, the output of which is connected to a transmission line represented symbolically by the arrow 4, which may be for example a cable, wire or radio connection. The transmission channel terminates at the receiving end in a mixing device 5 the output of which feeds the receiver teleprinter 2. Cipher pulse generators 6 and 7 deliver to the mixers 3 and 5 identical first and second series of cipher pulses respectively, the first series of pulses being mixed with the clear message pulse series generated by the teleprinter 1 in the mixer 3 at the transmitting end. After the ciphered clear message pulse series has been transmitted via the line 4, the clear message pulses are reproduced by mixing the second series of pulses generated by the generator 7, with the clear message pulses in the mixer 5 which controls the receiver teleprinter 2.

In order to generate identical cipher pulse series at the transmitter and receiver, it is necessary for the initial states of the two cipher pulse generators 6 and 7 to correspond. The determination of the initial state at the transmitter and receiver is effected by the use of a secret basic code and of an additional code which is derived from the date and time of the day in accordance with identical procedures at the transmitting and receiving ends. Consequently no transmission of this date-time code from the transmitter to the receiver is necessary.

Storage and delivery of the basic code is performed by two storage devices 8 and 9 which consist of punched tape reading devices in which the basic code, stored in the form of a punched tape, is read. Generation of the additional code is effected by date-time converters 10 and 11 at the transmitting and receiving ends respectively; these converters serve to produce the additional code from the date and time whenever required. By mixing the secret basic code and the date-time code in mixers 12 and 13, the initial state of each of the cipher pulse generators 6 and 7 is determined.

However, the date-time code may be used, not only to determine the initial state, but also for sporadic admixture to the pulses generated by the cipher pulse generators during the transmission of ciphered messages, thereby achieving an aperiodic pulse series. All that is necessary for this purpose is for the connection between the date-time convertors 10 and 11 and the mixers 12 and 13 to persist during the transmission of messages.

The use of the date-time code in combination with the secret basic code to form the initial states of the cipher pulse generators has the advantage that constantly changing new secret initial positions can be obtained without transmission. Nevertheless, in order to increase the degree of secrecy, a further additional code of random character may be mixed with the secret basic code in addition to the date-time code. This random additional code must of course be transmitted. In such an embodiment of the present invention it is advantageous to adopt the procedure that the date-time code and basic code are used to form a provisional initial state of the cipher pulse generators, the latter being started synchronously at the transmitting and receiving ends, and maintained in synchronism by, for example, transmitting synchronising pulses from the transmitter 1 to the receiver 2. The means by which such synchronism can be achieved is described in British patent specification No. 918,371. Then before the transmission of the actual messages, but with the generators running synchronously, the random additional code is generated by a random generator of known type at the transmitting end, and is transmitted to the receiving end and mixed synchronously into the cipher pulse generators at the transmitting and receiving ends.

The date-time code in combination with the secret basic code is used in this latter embodiment to obtain a provisional secret initial state for the synchronous starting of the transmitter and receiver, which cannot be tripped by unauthorized persons, in order subsequently to be able to transmit, in synchronism, the random additional code with which the final initial state of the cipher pulse generators for the subsequent transmission of messages is formed. The transmission of the random additional code is subtantially more certain than in an unsynchronised system, especially in the case of strong noise or interference in the transmission channel.

An embodiment of the present invention utilising a random additional code is illustrated schematically by dotted lines in FIG. 1. A random pulse series is generated in a random pulse generator 46, stored in a store 44 at the transmitting end, and after synchronism of the connection has been established by means of the date-time code, is transmitted via connection 47, the line 4 and connection 48 to a store 45 at the receiving end. The random additional code information which is now present in the stores 44 and 45 is mixed synchronously into the cipher pulse generators via the mixers 12 and 13 respectively.

Figure 2:
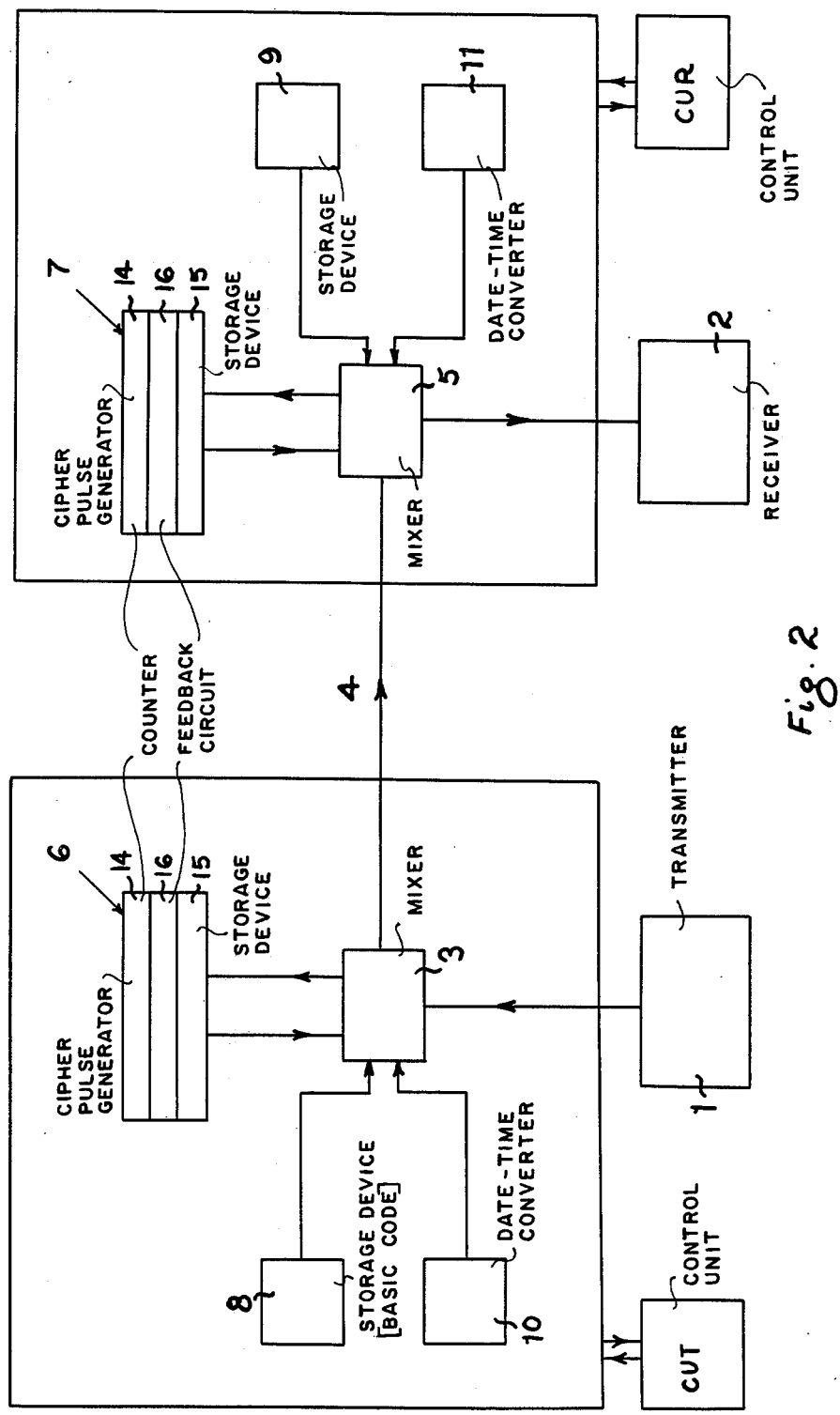

In a further embodiment of the present invention there is shown in FIG. 2, cipher pulse generators 6 and 7 each of which includes at least one counter 14, a store 15, preferably constructed as a shift register, and a feedback circuit 16 connected between the counter and the store. The counter 14 establishes a minimum length for the first series of cipher pulses within which no repetition of the first series occurs. The counter 14 therefore ensures the requisite minimum period length and thus fulfils a similar function to the date-time code when the latter is mixed with the cipher pulses during the transmission of messages. The feedback circuit 16 ensures the requisite irregularity of generation of the cipher pulse which are consequently of virtually random distribution. The feedback circuit is controlled by the instantaneous states of the counter which in turn influences the distribution of the pulses generated by the cipher pulse generator. Such generators are described in British patent specifications Nos. 951,174 and 973,536.

When cipher pulse generators constructed in this manner are used, it is possible for the mixers used to cipher the clear message impulses, to be used additionally to form the initial state of the cipher pulse generators. To this end, as FIG. 2 shows, the basic code transmitters 8 and 9 and the date-time code transmitters 10 and 11 at the transmitting and receiving ends respectively are connected to the mixers 3 and 5 respectively. The mixers are also connected to the associated store 15 of the cipher pulse generators 6 and 7 and to the teleprinters 1 and 2.

The transmitting and receiving ends of FIG. 2 are controlled, by means of control units CUT and CUR respectively, to form the initial state of the cipher pulse generators in such a way that, starting from the initial zero position of the counters 14, a first part of the basic code is placed in the shift register 15, whereafter the content of this shift register is mixed in the mixer 3 or 5 with the instantaneous date-time code and the result of this mixing is again stored in the shift register 15. Then the present content of the shift register 15 is transferred into the counter 14. The position of the counter 14 which thus results could be used as an initial position of the cipher code generators. Preferably, however, there follows a second phase in which the state of the shift register 15 is additionally adjusted as a function of the basic code and date-time code. To this end, a second part of the basic code is placed in the shift register 15, mixed in the mixer 3 or 5 with the instantaneous date-time code — which may have changed with respect to the first phase — and the result of this mixing stored back in the shift register 15.

The processes described hereinbefore occur simultaneously but independently at the transmitting and receiving ends. At the end of the two phases, the initial state of the cipher pulse generators 6, 7 is determined by the position of the counters 14 and the state of the shift registers 15. The ciphered transmission could now be commenced directly with this initial state. Preferably, however, the cipher pulse generators at the transmitting and receiving ends are allowed to run independently and without transmission for a number of steps starting from this initial state, and the transmission is commenced only with the new initial state thus obtained. This is intended to confuse the relationship of the code impulse series to the basic code.

Figure 3:
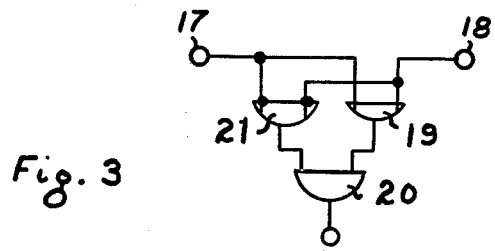
FIG. 3 shows a logic circuit for mixing corresponding pulses of two code series.

As already mentioned it is advantageous to use binary coded numbers for the series of code pulses. In this case the mixing of the series of pulses is effected by sign multiplication or "modulo 2 mixing". FIG. 3 shows a mixing device, using logic symbols for "modulo 2 mixing". The two pulse series required to be mixed together are fed to inputs 17 and 18 which are connected to the two inputs of an OR gate 19, which are in parallel with the inputs of an inverse OR gate 21. The output from the two gates 19 and 21 are connected to the input of AND gate 20, at the output of which a pulse series is obtained representing the result of the mixing of the two pulse series.

Figure 4:
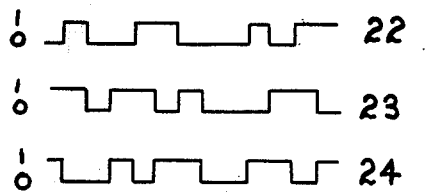
FIG. 4 shows the pulse waveforms of the two series of code pulses to be mixed in the circuit of FIG. 3 and the resulting waveform.

In FIG. 4 which shows the waveform of the two pulse series and the resulting output waveform, 22 represents an impulse series which corresponds, from left to right, to the binary number 0 1 0 0 1 1 0 0 0 1 0 1 1, 23 shows the second binary number 1 1 0 1 1 0 1 0 0 0 1 1 0 which is required to be mixed with the first number and 24 represents the result of mixing 22 and 23 by the binary number 1 0 0 1 0 1 1 0 0 1 1 0 1.

Figure 5:
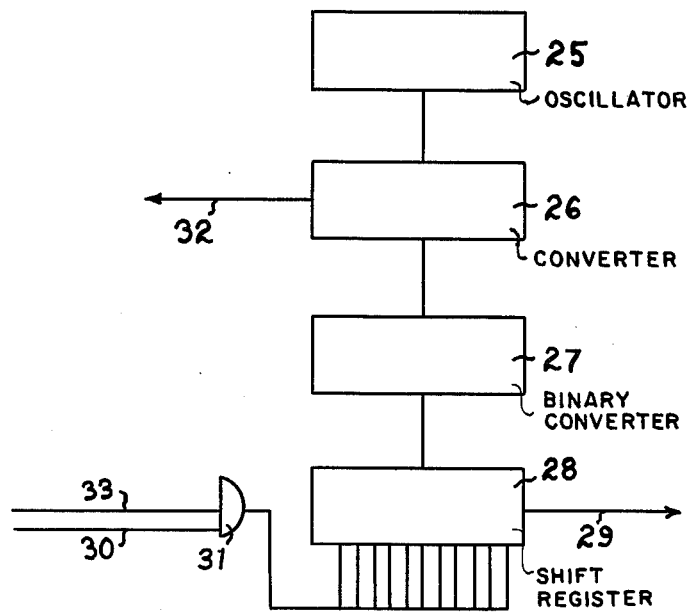
FIG. 5 shows a date-time code generator.

The arrangement illustrated schematically in FIG. 5, is used to generate the additional date-time code. The output of a quartz-controlled oscillator 25 feeds a convertor 26, which converts the oscillator signal into signals representing the date (day, month and year) and time (hour, minute). The resultant signals are fed to a binary convertor 27 where the date, hour and minute signals are converted into binary form, which are transferred into a shift register 28 for storage. The stored information is read out of the shift register as required — for example, in order to determine the initial position of the associated cipher pulse generator — and is fed via a conductor 29 to the mixers 12 and 13 of FIG. 1 or the mixers 3 and 5 of FIG. 2. The pulses required for reading out the shift register are fed to the shift register 28 via a conductor 30 and an AND gate 31. The shift register 28 is preferably reset every minute. In order that the additional code shall always be read out completely, it is necessary for the reading out of the shift register to be cut-off briefly before and during the setting process. The length of this cut-off period is equal to the sum of the read-out time, the time required for a setting process, and a safety time. For this purpose, there is fed to the control units CUT and CUR (FIG. 2) via a conductor 32 before each minute change, an impulse of a duration conforming to the above-mentioned cut-off period. During this cut-off time no control pulse for the reading out of the additional code can be generated in the control unit. The control pulse for reading out the date-time code impulse series is fed to the AND gate 31 via a conductor 33.

Figure 6:
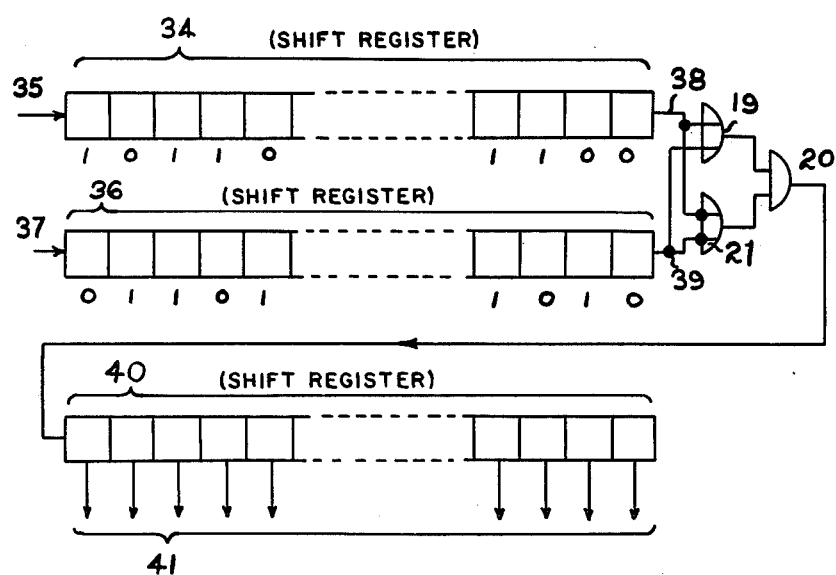
FIG. 6 shows a block circuit diagram of apparatus for determining the initial state of a cipher pulse generator by mixing the basic code and the date-time code.

The storage and mixing of the basic code and date-time code may be performed purely electronically. Thus, for example, in the arrangement according to FIG. 6, storage of the basic code is performed by a shift register 34, the number of stages in the register corresponding to the number of places in the basic code required to be stored. The pulse series required to be stored is fed in the form of pulses to an input 35, so that after feeding in of the basic code is complete, the stages of the shift register 34, read from right to left, show the basic code present in the form of a binary number. As indicated schematically therebeneath, this basic code reads, for example, 0 0 1 1 ... 0 1 1 0 1. A shift register 36 installed in exactly the same manner serves to store the date-time code (code shift information), which according to the illustration reads 0 1 0 1 ... 1 0 1 1 0. Outputs 38 and 39 of the two shift register 34 and 36 feed a module 2 mixer which corresponds to the arrangement of FIG. 3 and is consequently provided with identical reference symbols. The output of this module 2 mixer feeds a third shift register 40, which serves to store the initial state obtained by the mixing. The parallel outputs 41 of the shift register 40 serve to transfer this initial state into the cipher pulse generator.

What is claimed is:

1. A method of ciphering and deciphering messages comprising generating a series of cipher pulses, generating a series of basic code pulses, generating a series of additional code pulses representing date and time, mixing the code and date-time pulses to produce a series of pulses for controlling the generation of the cipher pulse, generating a series of pulses representing a message to be transmitted, mixing the cipher pulses with said message pulses and transmitting the ciphered message to a receiving station, generating a series of cipher pulses identical to and in synchronism with the control series of cipher pulses and mixing the identical series of cipher pulses with the ciphered message pulses to decipher the message.

2. A method according to claim 1 in which said additional date-time code pulses are generated in sequential groups, each group of pulses representing a different date-time combination.

3. A method according to claim 1 including generating a random series of pulses, mixing the random series of pulses with the control series of pulses, and transmitting the random series of pulses to the receiving station to control the generation of said identical series of cipher pulses so that both series of cipher pulses are identical and in synchronism.

4. A method of ciphering and deciphering messages comprising generating a series of basic code pulses, generating a series of additional code pulses representing date and time, mixing at least part of the series of basic code pulses with the series of additional date-time code pulses and storing the resulting series of mixed code pulses in a shift register, generating a series of pulses representing a message to be transmitted, controlling the read-out of said shift register by a counter which in turn controls the minimum period length of the resulting series of cipher pulses, mixing the message pulses with the cipher pulses read out of the shift register, and transmitting the ciphered message to a receiver, generating a series of cipher pulses identical to and in synchronism with the series of cipher pulses read out of the shift register, and mixing the identical series of cipher pulses with the received ciphered message pulses to decipher the message.

5. A method of ciphering and deciphering messages comprising generating a series of binary coded pulses representing date and time, generating a series of binary coded pulses representing a basic code, mixing the binary coded date-time and basic code series of pulses to produce a series of binary coded control pulses, generating a series of cipher pulses under control of the control pulses, generating a series of pulses representing a message to be transmitted, mixing the series of cipher pulses with the message pulses and transmitting the ciphered message pulses to a receiver, receiving the ciphered message pulses, generating a series of cipher pulses in an identical fashion to and in synchronism with the first mentioned series of cipher pulses, and mixing the identical series of cipher pulses with the received ciphered message pulses to decipher the message.

6. A method according to claim 5 in which the binary coded date-time series of pulses is generated by a quartz crystal controlled clock and a code converter, the former generating pulses representing the date and time and the latter converting the last mentioned pulses to binary form.

7. Apparatus for ciphering and deciphering messages comprising a cipher pulse generator for generating a series of cipher pulses, a code generator for generating a series of basic code pulses, a date-time generator for generating a series of additional code pulses representing date and time, a first mixer for mixing the basic code and additional date-time code pulses to produce a series of pulses to control the generation of the cipher pulses, a generator for generating a series of pulses representing a message to be transmitted, a second mixer for mixing the cipher pulses with said message pulses, and a receiver for receiving the transmitted ciphered message pulses including means to decipher said message comprising means operable in synchronism with said cipher pulse generator to generate a series of pulses identical to said series of control pulses and a third mixer for mixing said identical series of pulses with said ciphered message pulses to decipher said message.

8. Apparatus as claimed in claim 7 in which said date-time pulse generator generates sequential groups of pulses, each group representing a different time.

9. Apparatus as claimed in claim 7 including a random pulse generator for generating a random series of pulses, to store for storing said random series of pulses, means for mixing said random series of pulses with the basic code and additional date-time code series of pulses in said first mixer, and means for transmitting said random series of pulses to said receiver for controlling the generation of said identical series of cipher pulses so that both series of cipher pulses are identical and in synchronism.

10. Apparatus for ciphering and deciphering messages comprising a cipher pulse generator for generating a series of cipher pulses, a code generator for generating a series of basic code pulses, a date-time generator for generating a series of additional code pulses representing time and date, said cipher pulses generator including a shift register, a counter and a feedback circuit connecting said shift register to said counter, a control unit for controlling the entry of at least part of the basic code series of pulses into said shift register, a first mixer for mixing said additional date-time code series of pulses with the basic code series of pulses stored in said shift register, said control unit placing the series of cipher pulses produced by said first mixer into storage in said shift register, a generator for generating a series of pulse representing a message to be transmitted, means for feeding said message pulses into said first mixer for mixing with the series of cipher pulses stored in the shift register, means for transmitting said ciphered message to a receiver means in said receiver operable in synchronism with the cipher pulse generator to generate a series of pulses identical to the series of cipher pulses stored in said shift register and a second mixer for mixing said identical series of cipher pulses with the received ciphered messages pulses to decipher the message.

11. Apparatus for ciphering and deciphering messages comprising a first generator for generating a series of binary coded pulses representing date and time, a second generator for generating a series of binary coded pulses representing a basic code, a first mixer for mixing the binary coded date-time and basic code series of pulses to produce a series of binary coded control pulses, a third generator settable by said control pulses to generate a series of cipher pulses, a fourth generator for generating a series of pulses representing a message to be transmitted, a second mixer for mixing the series of cipher pulses with said message pulses for transmission, a receiver for receiving the ciphered message pulses including fifth, sixth and seventh generators and a third mixer all identically operable to the first, second and third generators and said first mixer respectively to produce a series of cipher pulses identical to and in synchronism with the cipher pulse series generated by said third generator and a fourth mixer for mixing said identical series of cipher pulses with the received ciphered message pulses to decipher said message.

12. Apparatus as claimed in claim 11, in which said first generator includes a quartz crystal controlled clock and a binary code converter, said clock providing electrical pulses representing the date and time and said converter converting the last mentioned pulses to a binary coded series of pulses.

13. Apparatus as claimed in claim 8 which said date-time pulse generator includes a quartz crystal controlled clock, said clock providing electrical pulses representing the date and time.

14. Apparatus for ciphering and deciphering messages comprising a cipher pulse generator for generating a series of cipher pulse, a code generator for generating a series of basic code pulses, a date-time generator for generating a series of additional code pulses representing a time and date, said cipher pulse generator including a shift register, a counter and a feedback circuit connecting said shift register to said counter, a control unit for controlling the entry of part of the basic code series of pulses into said shift register, a first mixer for mixing said additional date-time code series of pulses with the basic code series of pulses stored in said shift register, said control unit placing the series of mixed coded pulses produced by said first mixer into storage in said counter, said control unit controlling the entry of the other part of the basic code series of pulses into said shift register, means for mixing said additional date-time code series of pulses with said other part of the basic code series of pulses stored in said shift register, said control unit placing the series of cipher pulses produced by the means for mixing said other part of the basic code series and date-time code series of pulses into storage in said shift register, a generator for generating a series of pulses representing a message to be transmitted, means for feeding said message pulses into said first mixer for mixing with the series of cipher pulses stored in the shift register, means for transmitting said ciphered message to a receiver means in said receiver operable in synchronism with the cipher pulse generator to generate a series of pulses identical of the series of cipher pulses stored in said shift register and a second mixer for mixing said identical series of cipher pulses with the received ciphered message pulses to decipher the message.

* * * * *